US008432856B2

(12) United States Patent
Vermani et al.

(10) Patent No.: US 8,432,856 B2
(45) Date of Patent: Apr. 30, 2013

(54) HEURISTIC ALGORITHM FOR CALCULATING TARGET SINR FOR MMSE BEAMFORMING

(75) Inventors: Sameer Vermani, San Diego, CA (US); Alok Aggarwal, Foster City, CA (US)

(73) Assignee: QUALCOMM Incorporated, San Diego, CA (US)

( * ) Notice: Subject to any disclaimer, the term of this patent is extended or adjusted under 35 U.S.C. 154(b) by 349 days.

(21) Appl. No.: 12/683,068

(22) Filed: Jan. 6, 2010

(65) Prior Publication Data

US 2011/0164576 A1 Jul. 7, 2011

(51) Int. Cl.
*H04W 4/00* (2009.01)

(52) U.S. Cl.
USPC .......................................... 370/328

(58) Field of Classification Search .................. None
See application file for complete search history.

(56) References Cited

U.S. PATENT DOCUMENTS

| 7,502,340 | B1 | 3/2009 | Chuang et al. | |
|---|---|---|---|---|
| 7,801,075 | B2 * | 9/2010 | Lim et al. ..................... | 370/329 |
| 2004/0095907 | A1 | 5/2004 | Agee et al. | |
| 2006/0023624 | A1 * | 2/2006 | Han et al. ..................... | 370/204 |
| 2008/0070542 | A1 * | 3/2008 | Li et al. ........................ | 455/403 |
| 2009/0310701 | A1 * | 12/2009 | Shim et al. .................... | 375/267 |
| 2010/0110973 | A1 * | 5/2010 | Hart ............................... | 370/315 |
| 2010/0220601 | A1 * | 9/2010 | Vermani et al. ............... | 370/248 |
| 2010/0284454 | A1 * | 11/2010 | Oteri et al. .................... | 375/224 |
| 2011/0111760 | A1 * | 5/2011 | Bevan et al. .................. | 455/450 |

OTHER PUBLICATIONS

Farrokh Rashid-Farrokhi et al.,"Transmit Beamforming and Power Control for Cellular Wireless Systems", 19981001, vol. 16, No. 8, Oct. 1, 1998, XP011054861.
Inaki Berenguer et al., "Linear Precoding Versus Linear Multiuser Detection in Downlink TDD-CDMA Systems", IEEE Transactions on Wireless Communications, IEEE Service Center, Piscataway, NJ, US, vol. 5, No. 3, Mar. 1, 2007, pp. 780-786, XP011175174.
International Search Report and Written Opinion—PCT/US2011/020317—ISA/EPO—Jun. 21, 2011.
Rui Zhang et al., "Joint Beamforming and Power Control for Multiantenna Relay Broadcast Channel With QoS Constraints", IEEE Transactions on Signal Processing, IEEE Service Center, New York, NY, US, vol. 47, No. 2, Feb. 1, 2009, pp. 726-737, XP01123749.

* cited by examiner

*Primary Examiner* — Anh-Vu Ly
(74) *Attorney, Agent, or Firm* — Kenyon S. Jenckes

(57) ABSTRACT

Certain aspects of the present disclosure provide a heuristic algorithm for calculating accurate target SINR values for the minimum mean square error (MMSE) beamforming algorithm to decrease the complexity of the MMSE algorithm. The heuristic algorithm for calculating target SINR values considers practical system constraints, such as frequency selective channels, power amplifier distortion, imperfect channel state information as well as limited computing power at the access point.

48 Claims, 9 Drawing Sheets

HEURISTIC ALGORITHM FOR CALCULATING TARGET SINR FOR MMSE BEAMFORMING

TECHNICAL FIELD

The present disclosure generally relates to wireless communication, and more particularly, to calculating accurate SINR targets for the MMSE beamforming algorithm considering practical constraints in order to decrease the complexity of the MMSE algorithm.

BACKGROUND

In order to address the issue of increasing data rate requirements demanded for wireless communication systems, different schemes are being developed to allow multiple user terminals to communicate with a single base station by sharing the same channel (same time and frequency resources) while achieving high data throughputs. Spatial Division Multiple Access (SDMA) represents one such approach that has recently emerged as a popular technique for the next generation of communication systems.

In SDMA systems, a base station (i.e., an access point) may transmit or receive different signals to or from a plurality of mobile user terminals (i.e., stations) at the same time, using the same frequency band. In order to achieve reliable data communication, user terminals may need to be located in sufficiently different directions. Independent signals may simultaneously be transmitted from each of multiple space-separated antennas at the base station. Consequently, the combined transmissions may be directional, i.e., the signal that is dedicated for each user terminal may be relatively strong in the direction of that particular user terminal and sufficiently weak in directions of other user terminals. Similarly, the base station may simultaneously receive on the same frequency the combined signals from multiple user terminals through each of multiple antennas separated in space, and the combined received signals from the multiple antennas may be split into independent signals transmitted from each user terminal by applying the appropriate signal processing technique.

A multiple-input multiple-output (MIMO) wireless system employs a number ($N_T$) of transmit antennas and a number ($N_R$) of receive antennas for data transmission. A MIMO channel formed by the $N_T$ transmit and $N_R$ receive antennas may be decomposed into $N_S$ spatial streams, where, for all practical purposes, $N_S=\min\{N_T, N_R\}$. The $N_S$ spatial streams may be used to transmit $N_S$ independent data streams to achieve greater overall throughput.

In a multiple-access MIMO system based on SDMA, an access point can communicate with one or more user terminals at any given moment. If the access point communicates with a single user terminal, then the $N_T$ transmit antennas are associated with one transmitting entity (either the access point or the user terminal), and the $N_R$ receive antennas are associated with one receiving entity (either the user terminal or the access point). The access point can also communicate with multiple user terminals simultaneously via SDMA. For SDMA, the access point utilizes multiple antennas for data transmission and reception, and each of the user terminals typically utilizes less than the number of access point antennas for data transmission and reception. When SDMA is transmitted from an access point, $N_S=\min\{N_T, \text{sum}(N_R)\}$, where $\text{sum}(N_T)$ represents the summation of all user terminal receive antennas. When SDMA is transmitted to an access point, $N_S=\min\{\text{sum}(N_T), N_R\}$, where $\text{sum}(N_T)$ represents the summation of all user terminal transmit antennas.

An access point may support a plurality of stations in the same frequency band and at the same time. The access point may perform beamforming to spatially direct signals meant for different STAs. In downlink, the access point calculates the transmit power and directions of the beamformers for each spatial stream. A minimum mean square error (MMSE) beamforming algorithm may be used to calculate the beamforming direction and power of a stream while nulling out the interference across stations for which the stream is not meant and getting the best signal strength at the station to which the stream is targeted.

There may be several optimization criteria within the MMSE beamforming framework, one of which is the transmit power minimization. In the transmit power minimization algorithm, the total transmit power at an access point is minimized while calculating the beamformers and power values that achieve a given set of target SNR values. However, the current state of the art does not include any of the practical system constraints, such as frequency selective channels, power amplifier distortion, imperfect channel state information as well as limited computing power at the access point in MMSE beamforming algorithm.

In addition, the MMSE algorithm performs expensive matrix computations in each iteration. The complexity of MMSE algorithm may be reduced by selecting a good initial estimate of the downlink power allocation based on target SINR values. If the initial target SINR values are accurate, reduced number of iterations of the MMSE beamforming algorithm may provide suitable results.

Therefore, there is a need in the art for a technique to calculate accurate SINR targets for the MMSE beamforming algorithm considering practical constraints to decrease the complexity of the MMSE algorithm.

SUMMARY

Certain aspects provide a method for wireless communications by an access point. The method generally includes selecting one or more target signal to noise plus interference ratio (SINR) values for one or more spatial streams using a heuristic algorithm, wherein the heuristic algorithm takes into account practical system constraints and modulation and coding scheme (MCS) of the spatial streams, and calculating one or more precoding matrices for the spatial streams for one or more frequency tones by an iterative minimum mean square error (MMSE) beamforming algorithm using the target SINR values.

Certain aspects provide an apparatus for wireless communications by an access point. The apparatus generally includes means for selecting one or more target signal to noise plus interference ratio (SINR) values for one or more spatial streams using a heuristic algorithm, wherein the heuristic algorithm takes into account practical system constraints and modulation and coding scheme (MCS) of the spatial streams, and means for calculating one or more precoding matrices for the spatial streams for one or more frequency tones by an iterative minimum mean square error (MMSE) beamforming algorithm using the target SINR values.

Certain aspects provide an apparatus for wireless communications by an access point. The apparatus generally includes logic for selecting one or more target signal to noise plus interference ratio (SINR) values for one or more spatial streams using a heuristic algorithm, wherein the heuristic algorithm takes into account practical system constraints and modulation and coding scheme (MCS) of the spatial streams, and logic for calculating one or more precoding matrices for the spatial streams for one or more frequency tones by an iterative minimum mean square error (MMSE) beamforming algorithm using the target SINR values.

Certain aspects of the present disclosure provide a computer-program product for wireless communications by an access point, comprising a computer readable medium having instructions stored thereon, the instructions being executable by one or more processors. The instructions generally include instructions for selecting one or more target signal to noise plus interference ratio (SINR) values for one or more spatial streams using a heuristic algorithm, wherein the heuristic algorithm takes into account practical system constraints and modulation and coding scheme (MCS) of the spatial streams, and instructions for calculating one or more precoding matrices for the spatial streams for one or more frequency tones by an iterative minimum mean square error (MMSE) beamforming algorithm using the target SINR values.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Various aspects of certain aspects of the present disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

The word "exemplary" is used herein to mean "serving as an example, instance, or illustration." Any aspect described herein as "exemplary" is not necessarily to be construed as preferred or advantageous over other aspects. Also as used herein, the term "legacy stations" generally refers to wireless network nodes that support 802.11n or earlier versions of the IEEE 802.11 standard.

The multi-antenna transmission techniques described herein may be used in combination with various wireless technologies such as Code Division Multiple Access (CDMA), Orthogonal Frequency Division Multiplexing (OFDM), Time Division Multiple Access (TDMA), and so on. Multiple user terminals can concurrently transmit/receive data via different (1) orthogonal code channels for CDMA, (2) time slots for TDMA, or (3) sub-bands for OFDM. A CDMA system may implement IS-2000, IS-95, IS-856, Wideband-CDMA (W-CDMA), or some other standards. An OFDM system may implement IEEE 802.11 or some other standards. A TDMA system may implement GSM or some other standards. These various standards are known in the art.

An Example MIMO System

Figure 1:
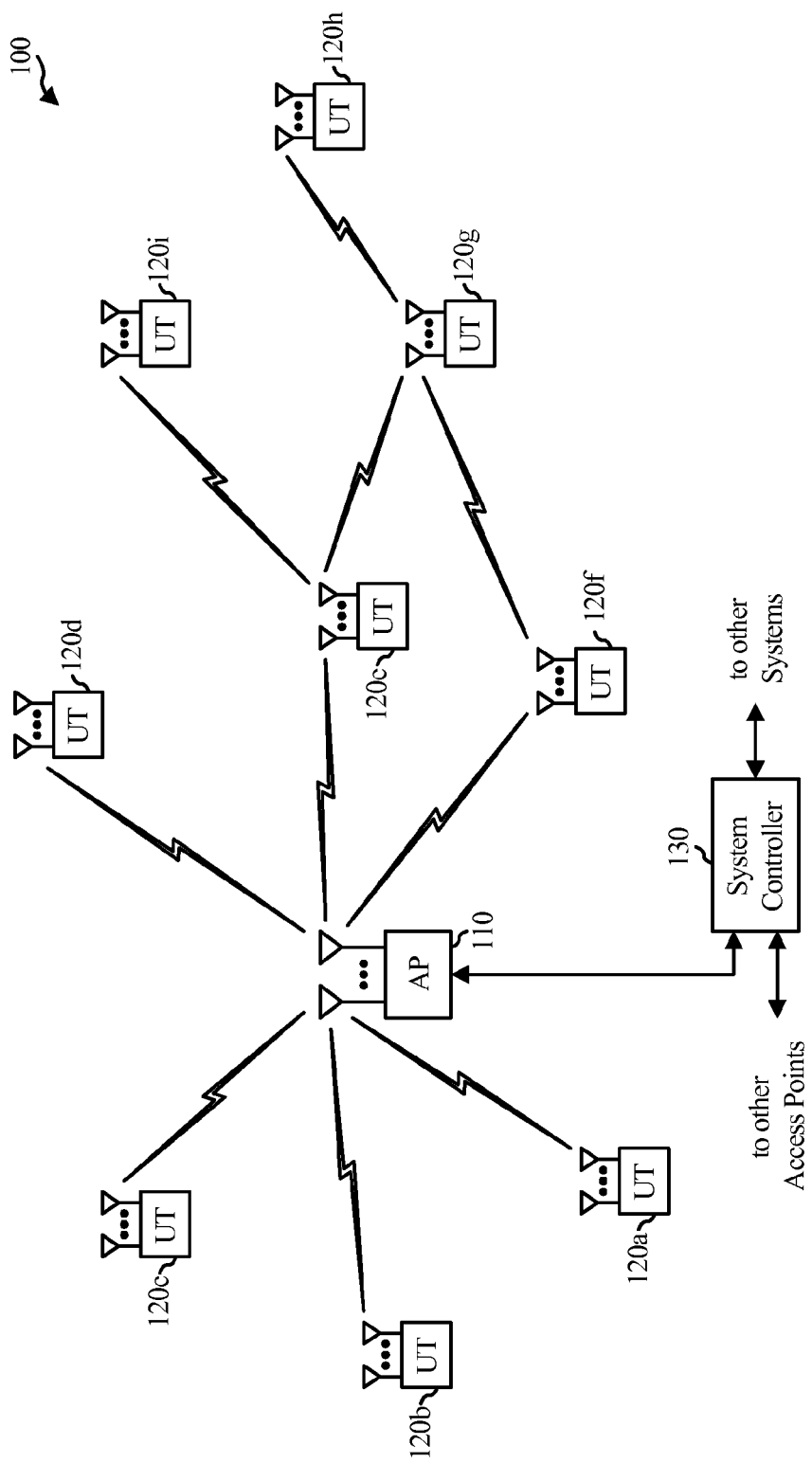
FIG. 1 illustrates a spatial division multiple access MIMO wireless system in accordance with certain aspects of the present disclosure.

FIG. 1 illustrates a multiple-access multiple-input multiple-output (MIMO) system 100 with access points and user terminals. For simplicity, only one access point 110 is shown in FIG. 1. An access point (AP) is generally a fixed station that communicates with the user terminals and may also be referred to as a base station or some other terminology. A user terminal may be fixed or mobile and may also be referred to as a mobile station, a station (STA), a client, a wireless device, or some other terminology. A user terminal may be a wireless device, such as a cellular phone, a personal digital assistant (PDA), a handheld device, a wireless modem, a laptop computer, a personal computer, etc.

Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

While portions of the following disclosure will describe user terminals 120 capable of communicating via spatial division multiple access (SDMA), for certain aspects, the user terminals 120 may also include some user terminals that do not support SDMA. Thus, for such aspects, an AP 110 may be configured to communicate with both SDMA and non-SDMA user terminals. This approach may conveniently allow older versions of user terminals ("legacy" stations) to remain deployed in an enterprise, extending their useful lifetime, while allowing newer SDMA user terminals to be introduced as deemed appropriate.

System 100 employs multiple transmit and multiple receive antennas for data transmission on the downlink and uplink. Access point 110 is equipped with a number $N_{ap}$ of antennas and represents the multiple-input (MI) for downlink transmissions and the multiple-output (MO) for uplink transmissions. A set $N_u$ of selected user terminals 120 collectively represents the multiple-output for downlink transmissions and the multiple-input for uplink transmissions. For pure SDMA, it is desired to have $N_{ap} \geq N_u \geq 1$ if the data symbol streams for the $N_u$ user terminals are not multiplexed in code, frequency, or time by some means. $N_u$ may be greater than $N_{ap}$ if the data symbol streams can be multiplexed using different code channels with CDMA, disjoint sets of subbands with OFDM, and so on. Each selected user terminal transmits user-specific data to and/or receives user-specific data from the access point. In general, each selected user terminal may be equipped with one or multiple antennas (i.e., $N_{ut} \geq 1$). The $N_u$ selected user terminals can have the same or different number of antennas.

MIMO system 100 may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported).

Figure 2:
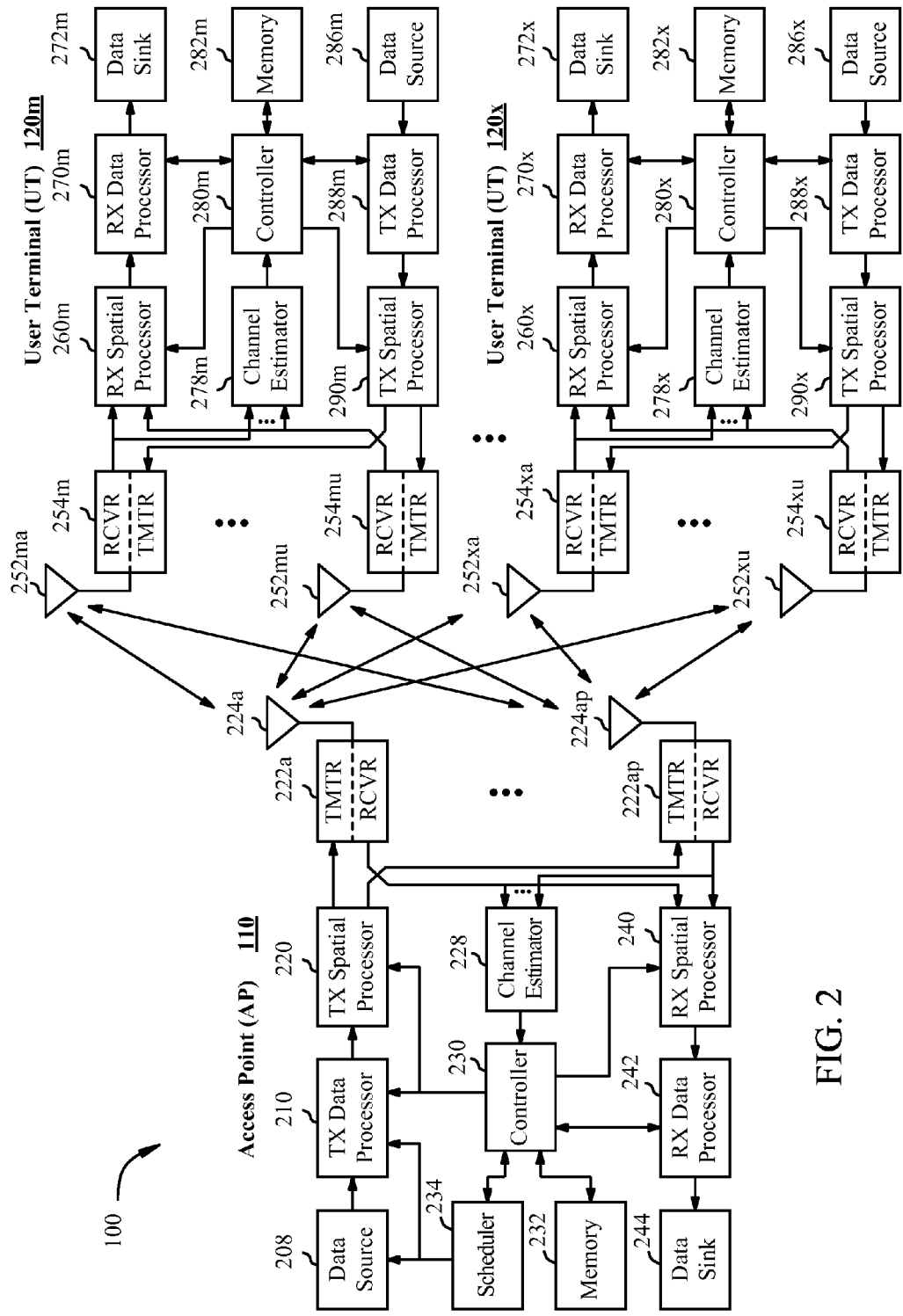
FIG. 2 illustrates a block diagram of an access point and two user terminals in accordance with certain aspects of the present disclosure.

FIG. 2 shows a block diagram of access point 110 and two user terminals 120m and 120x in MIMO system 100. Access point 110 is equipped with $N_{ap}$ antennas 224a through 224ap. User terminal 120m is equipped with $N_{ut,m}$ antennas 252ma through 252mu, and user terminal 120x is equipped with $N_{ut,x}$ antennas 252xa through 252xu. Access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval. The beam-steering or some other spatial processing technique may be used at the access point and user terminal.

On the uplink, at each user terminal 120 selected for uplink transmission, a TX data processor 288 receives traffic data from a data source 286 and control data from a controller 280. TX data processor 288 processes (e.g., encodes, interleaves, and modulates) the traffic data $\{d_{up,m}\}$ for the user terminal based on the coding and modulation schemes associated with the rate selected for the user terminal and provides a data symbol stream $\{s_{up,m}\}$. A TX spatial processor 290 performs spatial processing on the data symbol stream $\{s_{up,m}\}$ and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point 110.

A number $N_{up}$ of user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides $N_{up}$ recovered uplink data symbol streams. The receiver spatial processing is performed in accordance with the channel correlation matrix inversion (CCMI), minimum mean square error (MMSE), successive interference cancellation (SIC), or some other technique. Each recovered uplink data symbol stream $\{\hat{s}_{up,m}\}$ is an estimate of a data symbol stream $\{s_{up,m}\}$ transmitted by a respective user terminal. An RX data processor 242 processes (e.g., demodulates, deinterleaves, and decodes) each recovered uplink data symbol stream $\{\hat{s}_{up,m}\}$ in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal TX data processor 210 provides $N_{dn}$ downlink data symbol streams for the $N_{dn}$ user terminals. A TX spatial processor 220 performs spatial processing on the $N_{dn}$ downlink data symbol streams, and provides $N_{ap}$ transmit symbol streams for the $N_{ap}$ antennas. Each transmitter unit (TMTR) 222 receives and processes a respective transmit symbol stream to generate a downlink signal. $N_{ap}$ transmitter units 222 provide $N_{ap}$ downlink signals for transmission from $N_{ap}$ antennas 224 to the user terminals.

At each user terminal 120, $N_{ut,m}$ antennas 252 receive the $N_{ap}$ downlink signals from access point 110. Each receiver unit (RCVR) 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream $\{\hat{s}_{dn,m}\}$ for the user terminal. The receiver spatial processing is performed in accordance with the CCMI, MMSE, or some other technique. An RX data processor 270 processes (e.g., demodulates, deinterleaves, and decodes) the recovered downlink data symbol stream to obtain decoded data for the user terminal.

Figure 3:
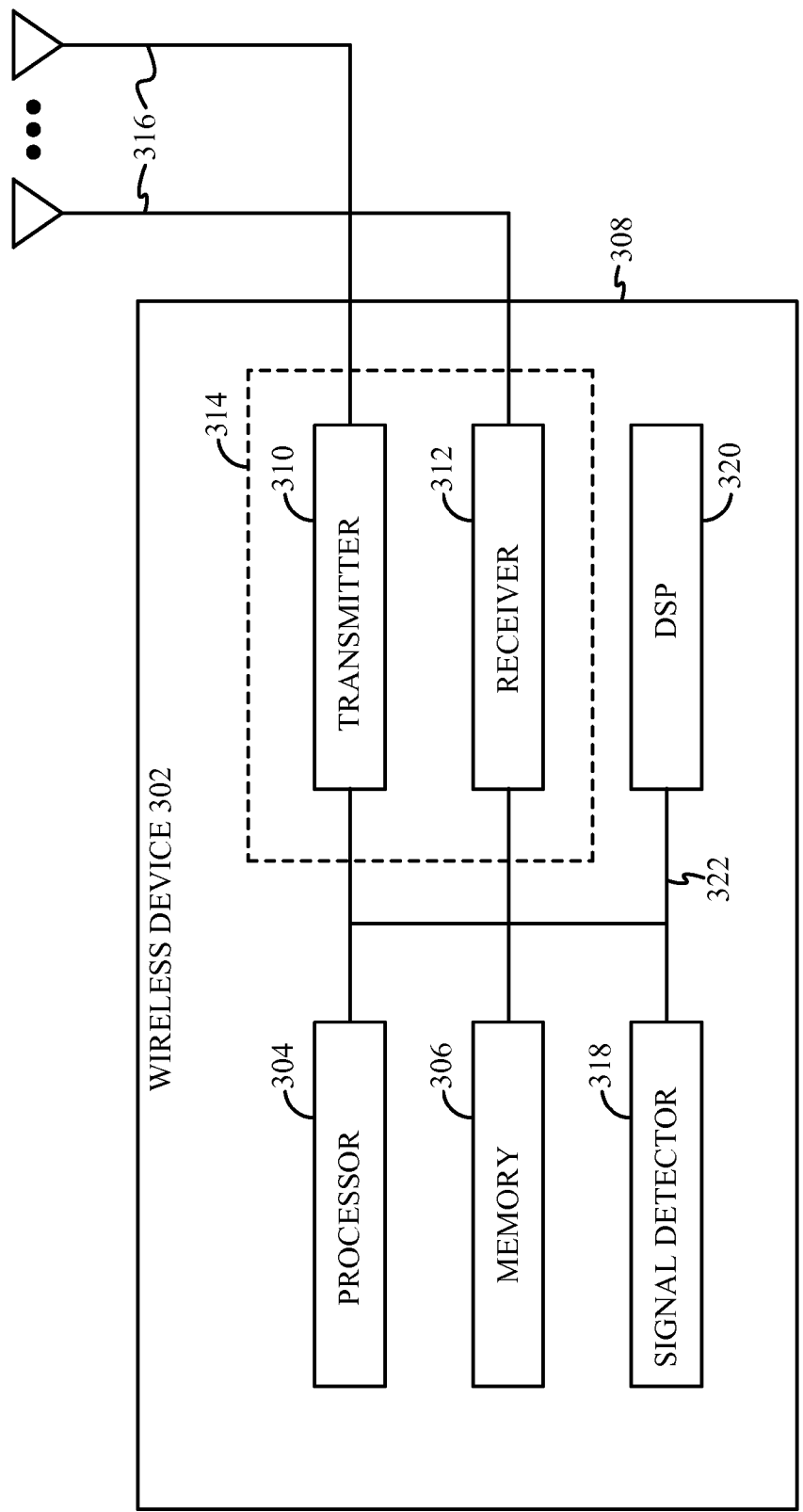
FIG. 3 illustrates example components of a wireless device in accordance with certain aspects of the present disclosure.

At each user terminal 120, $N_{ut,m}$ antennas 252 receive the $N_{ap}$ downlink signals from access point 110. Each receiver unit (RCVR) 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream $\{\hat{s}_{dn,m}\}$ for the user terminal. The receiver spatial processing is performed in accordance with the CCMI, MMSE, or some other technique. An RX data processor 270 processes (e.g., demodulates, deinterleaves, and decodes) the recovered downlink data symbol stream to obtain decoded data for the user terminal FIG. 3 illustrates various components that may be utilized in a wireless device 302 that may be employed within the system 100. The wireless device 302 is an example of a device that may be configured to implement the various methods described herein. The wireless device 302 may be an access point 110 or a user terminal 120.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

As used herein, the term "legacy" generally refers to wireless network nodes that support 802.11n or earlier versions of the 802.11 standard.

While certain techniques are described herein with reference to SDMA, those skilled in the art will recognize the techniques may be generally applied in systems utilizing any type of multiple access schemes, such as SDMA, OFDMA, CDMA, and combinations thereof.

Heuristic Algorithm for Calculating Target SINR for MMSE Beamforming

An access point may support a plurality of stations in the same frequency band and at the same time. The access point may perform beamforming to spatially direct signals meant for different stations (STA). In downlink SDMA, the access point calculates the transmit power and directions of the beamformers for each spatial stream. The minimum mean square error (MMSE) beamforming algorithm may be used to calculate the beamforming direction and power of a stream while nulling out the interference across stations for which the stream is not meant and getting the best signal strength at the station to which the stream is targeted.

There could be several optimization criteria within the MMSE beamforming framework, one of which is the transmit power minimization. In the transmit power minimization algorithm, the total transmit power at the access point is minimized while calculating the beamformers and power values that achieve a given set of target SINR values. However, the current state of the art does not include any of the practical system constraints, such as frequency selective channels, power amplifier distortion, imperfect channel state information as well as limited computing power at the access point in MMSE beamforming algorithm.

The present disclosure presents techniques to calculate accurate SINR targets for the MMSE beamforming algorithm considering practical constraints to decrease the complexity of the MMSE algorithm.

Figure 4:
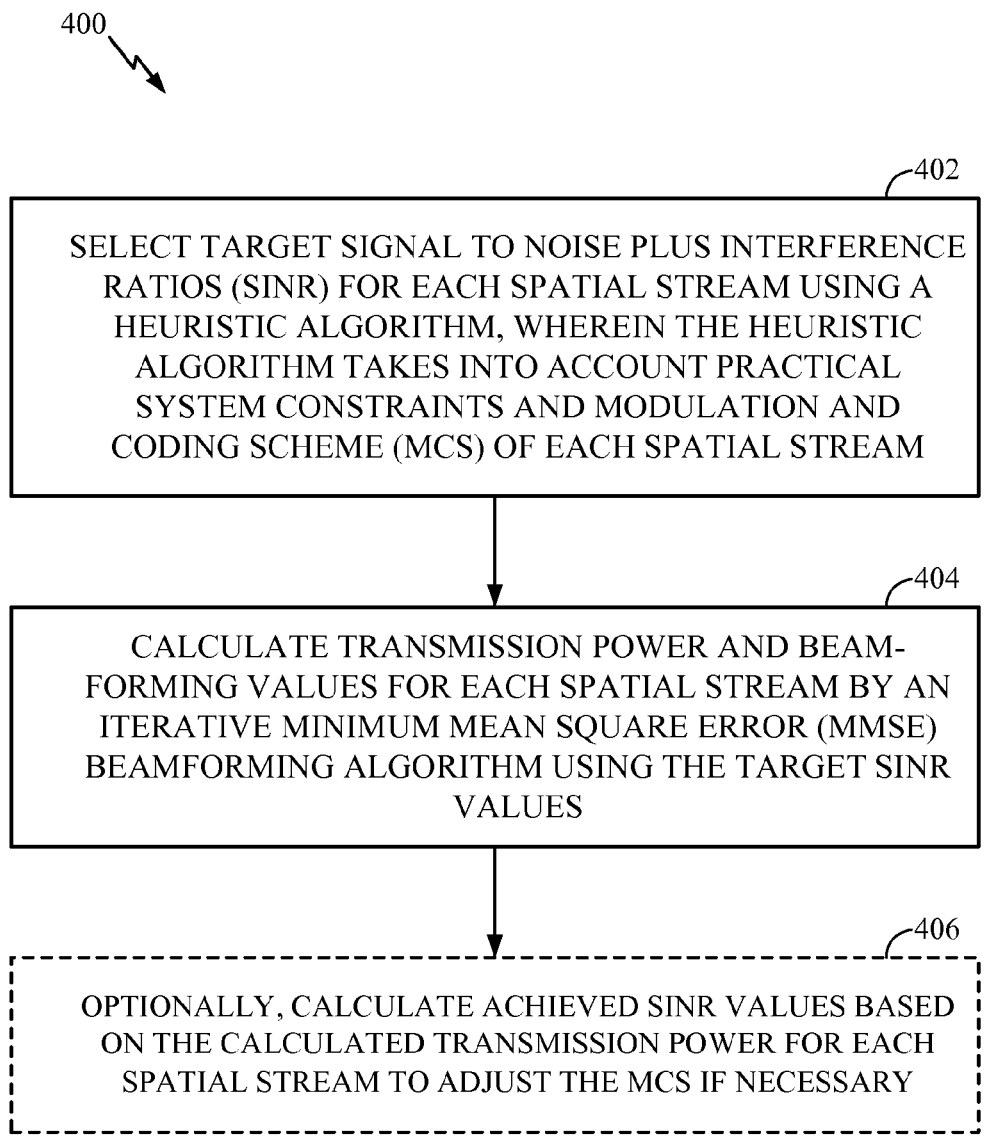
FIG. 4 illustrates example operations for a physical layer scheduling algorithm using minimum mean square error (MMSE) beamforming algorithm, in accordance with certain aspects of the present disclosure.

FIG. 4 illustrates example operations for a scheduling algorithm for downlink SDMA, in accordance with certain aspects of the present disclosure. The proposed scheduling algorithm reduces the complexity of the MMSE beamforming algorithm by choosing accurate target SINR values. At 402, the access point selects one or more target signal to noise plus interference ratio (SINR) values for one or more spatial streams using a heuristic algorithm, wherein the heuristic algorithm takes into account practical system constraints and modulation and coding scheme (MCS) of the spatial streams. The practical channel limitations may include path-loss, thermal noise floor, power amplifier non-linearity and so on.

At 404, the access point calculates one or more precoding matrices for the spatial streams for one or more frequency tones by an iterative minimum mean square error (MMSE) beamforming algorithm using the target SINR values. The computational complexity of the MMSE beamforming algorithm may be high because of matrix computations with channel state information (CSI). Therefore, it may be desirable to run the MMSE iterative algorithm for only one iteration to reduce the complexity. It is possible to reduce the complexity of the MMSE algorithm without loss of performance if the algorithm starts with accurate initial values.

At 406, the access point may optionally calculate one or more achieved SINR values based on the one or more precoding matrices to adjust the selected MCSs. If the achieved SINR is different from the target SINR, the MCS for each stream may be adjusted and the algorithm may continue from step 402 with adjusted MCS values.

Figure 5:
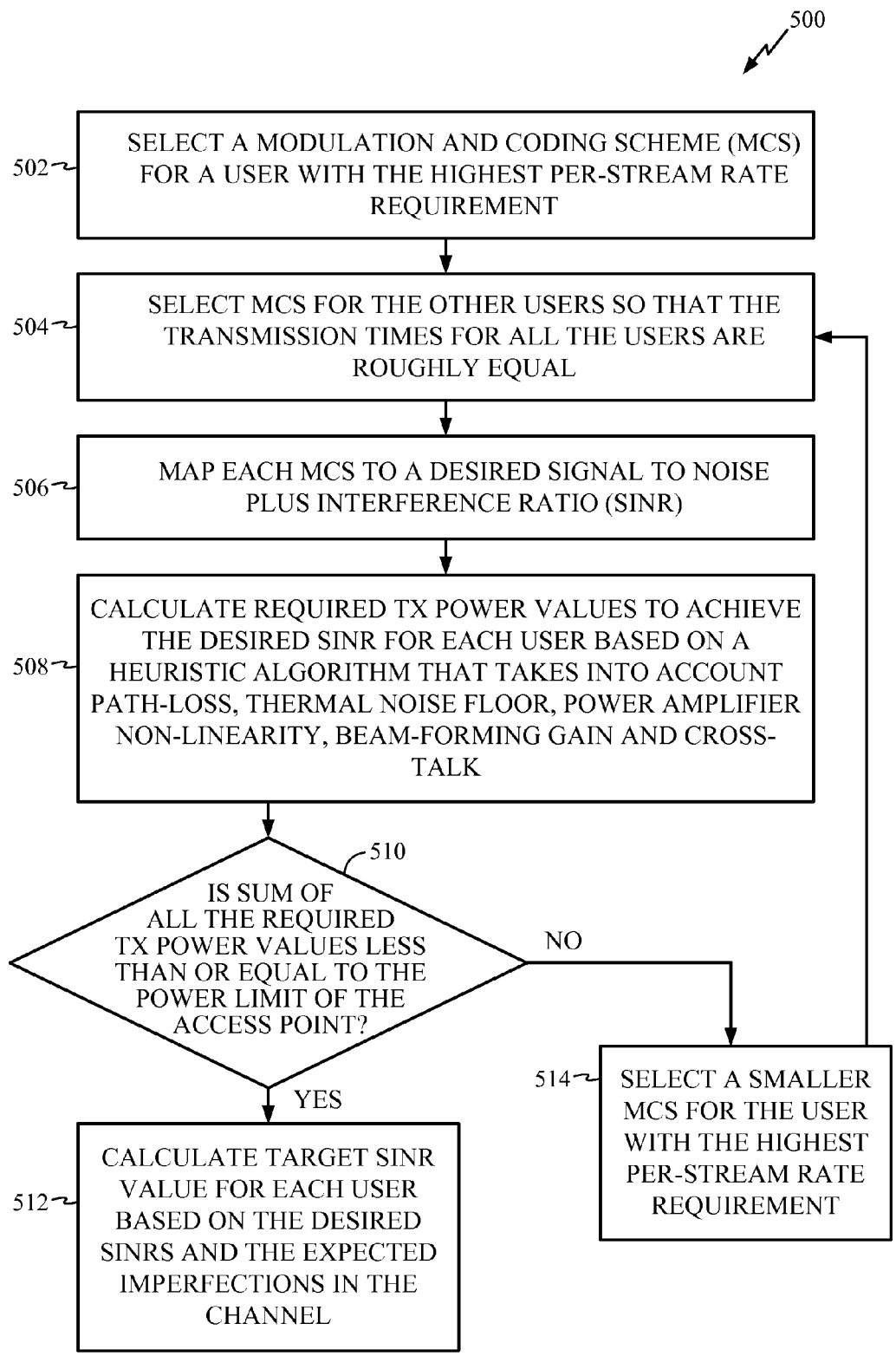
FIG. 5 illustrates example operations for an algorithm for selecting accurate target SINR values for each spatial stream in the MMSE algorithm, in accordance with certain aspects of the present disclosure.

FIG. 5 illustrates example operations for an algorithm for selecting accurate target SINR values for each spatial stream, in accordance with certain aspects of the present disclosure. The calculated target SINR values may be used as an input to the MMSE beamforming algorithm to decrease the computational complexity of the algorithm by reducing the required number of iterations for convergence. At 502, the access point selects an MCS for a user with a highest per-stream rate requirement. At 504, the access point selects MCSs for other users so that transmission time for all the users are approximately equal. At 506, the access point maps each of the MCSs to a desired signal to noise plus interference ratio value.

At 508, the access point calculates a plurality of required transmit power values to achieve the desired SINR value for each of the users based on the heuristic algorithm that takes into account the practical system constraints such as path-loss value, thermal noise floor, power amplifier non-linearity, beam-forming gain and approximate cross-talk due to imperfect channel knowledge and degree of interpolation of the precoding matrices. It should be noted that this heuristic algorithm has reduced computational complexity because CSI is not used.

At 510, the access point calculates the sum of all the required transmit power values and checks if the sum of all the required transmit power values is less than or equal to the power limit of the access point. If yes, at 512, the access point calculates a target SINR value for each of the users based at least on the desired SINR values and expected imperfections in the channel. At 514, if sum of all the required transmit power values is more than the power limit of the access point, the access point selects a smaller MCS for the user with the highest per-stream rate requirement and repeats the algorithm from step 504.

An iterative MMSE beamforming algorithm may be employed for each stream to calculate the power allocation and beam former values for each stream using the target SINR values that are calculated based on the proposed heuristic method. The MMSE algorithm calculates a beam-forming solution with minimum power that achieves the SINR targets by utilizing uplink-downlink duality.

In the MMSE beamforming algorithm, for a given set of transmission power values, the MMSE filters are the optimum receive beam-formers for each uplink stream. Power optimization may be done iteratively until the SINR requirement for each user is met. Once the optimal downlink filters—that are similar to the uplink filters because of the duality—are known, the downlink power values may be calculated using the SINR values. The MMSE beamforming algorithm converges to a solution in approximately two iterations, wherein each iteration involves expensive matrix computations.

The complexity of the MMSE algorithm may be reduced by reducing the number of iterations of the algorithm. For certain aspects of the present disclosure, the number of iterations of the MMSE algorithm may be reduced by selecting a good initial estimate of the downlink power allocation based on target SINR values. If the initial target SINR values are accurate, even one iteration of the MMSE beamforming algorithm may provide acceptable results.

For certain aspects of the present disclosure, complexity of the MMSE algorithm may be reduced by utilizing the MMSE algorithm to calculate precoding matrices for the spatial streams in a subset of frequency tones and interpolating the results to calculate the precoding matrices for the rest of the frequency tones.

Mathematical Description

Various algorithms may be utilized to calculate the values of the SINR target as described above with reference to FIGS. 4 and 5. For example, with perfect channel knowledge and no precoder interpolation, the SINR may be written as follows:

$$SINR_i \approx \frac{\alpha_i P_i}{\sigma_N^2 + \alpha_i \sigma_D^2} \cdot G_{bf} \quad (1)$$

where $P_i$ is the power allocated to stream i, $G_{bf}$ represents beamforming gain, $\alpha_i$ represents the path loss for stream i, $\sigma_N^2$ represents thermal noise variance, and $\sigma_D^2$ represents transmitter distortion.

For imperfect beamforming due to precoder interpolation or imperfect CSI, the SINR can be written as follows:

$$SINR_i \approx \frac{\alpha_i P_i}{\sigma_N^2 + \alpha_i \sigma_D^2 + \alpha_i \beta \sum_{j=1, j \neq i}^{S} P_j} \cdot G_{bf} \quad (2)$$

where $\beta$ represents a cross-talk factor, which is an estimate of how much power from other streams leaks into each received stream. S represents the total number of downlink streams. Spatial stream power values $P_i$ should satisfy the condition $$\sum_{i=1}^{S} P_i \leq A,$$

in which A represents the maximum total signal power at the transmitter. Also, if the transmission power is close to the maximum power per tone, then the relation $$\sum_{j=1, j \neq i}^{S} P_j \approx A - P_i \text{ holds.}$$

For certain embodiments of the present disclosure, in case of perfect beam-forming, the power required for achieving a desired SINR value for stream i may be estimated as follows:

$$\hat{P}_{i,perfect} = SINR_{i,Desired} - 10 \log_{10}(\alpha_i) + 10 \log_{10}(\sigma_N^2 + \alpha_i \sigma_D^2) - G_{bf}(N_{Tx}, S) \quad (3)$$

where $SINR_{i,Desired}$ and $G_{bf}(N_{Tx},S)$ are measured in dB, S is the total number of downlink streams, $N_{Tx}$ is the number of transmit antennas at the access point, $G_{bf}(.)$ is a beamforming function, $\alpha_i$ is the path-loss for stream i, A represents the total power at the transmitter, $\sigma_N^2$ is the thermal noise variance and $\sigma_D^2$ is the transmitter distortion noise.

Equation (3) takes into account a plurality of parameters, such as the desired SINR value needed to support a selected MCS, path loss, thermal noise and transmit distortion noise, beamforming gain, number of spatial streams and orthogonality of the channel. The beamforming gain may depend on the number of transmit antennas. There is also a direct relation between the orthogonality degree of the channel and the achieved beamforming gain. Orthogonality of the channel may be estimated empirically by averaging across a large number of channel realizations For certain embodiments of the present disclosure, imperfect beamforming may be considered in estimating the power required for stream i. The imperfect beamforming may happen as a result of imperfect CSI or precoder interpolation. The power for each stream i for imperfect beamforming may be derived with an equation:

$$\hat{P}_{i,imperfect} = SINR_{i,Desired} - 10 \log_{10}(\alpha_i) + 10 \log_{10}(1 + \beta \cdot 10^{SINR_{i,Desired}/10}) - G_{bf}(N_{Tx},S) + 10 \log_{10}(\alpha_i(\sigma_D^2 + \beta A) + \sigma_N^2) \quad (4)$$

The cross-talk factor $\beta \geq 0$ models the interference because of imperfections in the system. The interference seen by a stream may be modeled by considering the cross-talk factor, pathloss and the power of the stream. Therefore, a fraction of the combined power of the other streams that leaks into the stream of interest may be estimated as follows:

Interference=$\beta \times (A-\text{StreamPower}) \times \text{Pathloss}$

For certain embodiments of the present disclosure, the cross-talk factor may be estimated empirically by comparing two systems with and without imperfections, and identifying the increase in the interference as a result of imperfections. The cross-talk factor depends on expected imperfections in the precoding matrix. By averaging the interference across a large number of channel realizations, an average cross-talk factor may be calculated.

The MMSE iterations take into account two sources of noise, including thermal noise and noise based on transmit distortion. The transmit distortion noise is only a function of total power limit at the AP, if transmission power is close to the limit. The values of the individual power per stream does not affect the transmit distortion noise. The transmit distortion noise remains constant if transmit error vector magnitude (EVM) is fixed.

The MMSE iterations do not take into account interference based on imperfect channel knowledge or degree of interpolation. The imperfect channel knowledge may be a function of power distribution and not just total power, which is very difficult to model. Therefore, for certain embodiments of the present disclosure, the SINR targets that are input to the MMSE algorithm may be pre-adjusted (increased) to take into account the expected reduction in SINR due to imperfect beamforming As a result, the final SINR targets that are passed to the MMSE algorithm (refer to FIG. 4, block 404 and FIG. 5, block 512), may be calculated as follows:

$$SINR_{target}{}^{i} = SINR_{desired}{}^{i} + \hat{P}_{i,imperfect} - \hat{P}_{i,perfect}$$

where the term $\hat{P}_{i,imperfect} - \hat{P}_{i,perfect}$ shows the adjustment of the target SINR values.

Simulation Results

In this section, simulation results are presented to show the benefits of the proposed scheme for calculating an accurate SINR target to be used in the calculation of the transmission power and a beamforming vector per spatial stream. In the first simulation, the proposed scheme is compared with zero-forcing (ZF) algorithm. In a zero-forcing algorithm, the input signal is multiplied by the inverse of the channel response to remove the effect of channel from the received signal.

The following parameters are used in the first simulation environment. An access point with 8 Tx antennas, 24 dBm Tx power, −30 dB PA EVM, 8 STAs with one receive antenna each, 100 dB pathloss for each STA, equal packet size for all STAs, −94 dBm noise floor, IEEE 802.11n Channel D model which uses only 56 data and pilot tones out of 64 available tones.

The simulation results show that, for 8 STAs, the target SINRs are 7.4 dB for each STA, average SINR for ZF=4.6 dB, and the average SINRs are 7.7 to 7.9 dB for the proposed method with 3 iterations. Therefore, the modified MMSE algorithm tends to significantly outperform ZF algorithm when all spatial streams are utilized. The ZF algorithm is more sensitive to an ill-conditioned channel matrix.

In the second simulation, equal pathloss values and equal rates are considered for all the users. The simulation parameters are as follows: AP with 8 transmit (Tx) antennas, 24 dBm Tx power, −30 dBM PA EVM, 6 STAs with one receive antenna each, 100 dB path loss for each STA, same packet size for all the STAs, a single spatial stream per STA, −94 dBm noise floor, IEEE 802.11n Channel D model. The following imperfections are considered: 30 dB channel estimation floor, performing precoding or beamforming calculations on every other tone, and performing linear interpolation of precoders on the rest of the tones.

Simulation results for the users with equal path loss and equal rate are as follows. For a first case without including cross-talk-factor in target SINR computation, desired SINRs are [10 10 10 10 10 10] dB based on the selected MCS. Without considering imperfection, achieved SNRs are [11.1 11.2 11.2 11.2 11.2 11.3] dB. With imperfections, achieved SNRs are [10.7 11.0 10.9 10.8 10.9 11.0] dB. Therefore, the desired SINRs were over-achieved even when imperfections were included in the simulation model. Therefore, an MCS that is selected based on the target SINR values or predicted achieved SINRs goes through.

For a second case in the second simulation that includes cross-talk-factor, the target SINR values that are adjusted for the cross-talk before entering the MMSE beamforming algorithm are [10.1 10.1 10.1 10.1 10.1 10.1]. Considering the imperfections, the achieved SINR values are [10.7 11.1 11.0 10.9 10.9 11.0] dB. Therefore, an MCS that is selected based on the targets or predicted achieved SINRs goes through In the third simulation, unequal path loss values and unequal rates are considered for all the users. The simulation parameters are as follows. AP with 8 Tx antennas, 24 dBm Tx power, −30 dB PA EVM, 3 STA with 2 Rx antenna each, [90 75 75] dB path loss for each STA, [54 25 25] packet size per STA, [2 2 2] spatial streams per STA, −94 dBm noise floor, IEEE 802.11n Channel D model.

In addition, in the third simulation, some imperfections are considered in the simulation environment, such as 30 dB channel estimation error floor, performing precoding calculations on every other tone, and performing linear interpolation of precoders on the rest of the tones. The simulation results without including the cross-talk-factor in calculating the target SINR values are as follows: The desired SINRs are [20.5 13 13] dB based on MCS, achieved SINRs are [23.1 14.7 14.7] dB for the case without imperfection and, achieved SINRs are [22.1 12.8 12.9] dB for the case with imperfections. In this example, desired SINRs were under-achieved when imperfections were included. Therefore, the MCS picked based on the targets does not go through and should be reduced.

For the third simulation, including cross-talk-factor, the target SINR values that are adjusted for the cross-talk before entering the MMSE beamforming algorithm are [21.1 15 15]. With imperfections, achieved SINRs are [21.7 13.8 13.8] dB therefore, the MCS picked based on the target SINR values or predicted achieved SINRs goes through.

Figure 6:
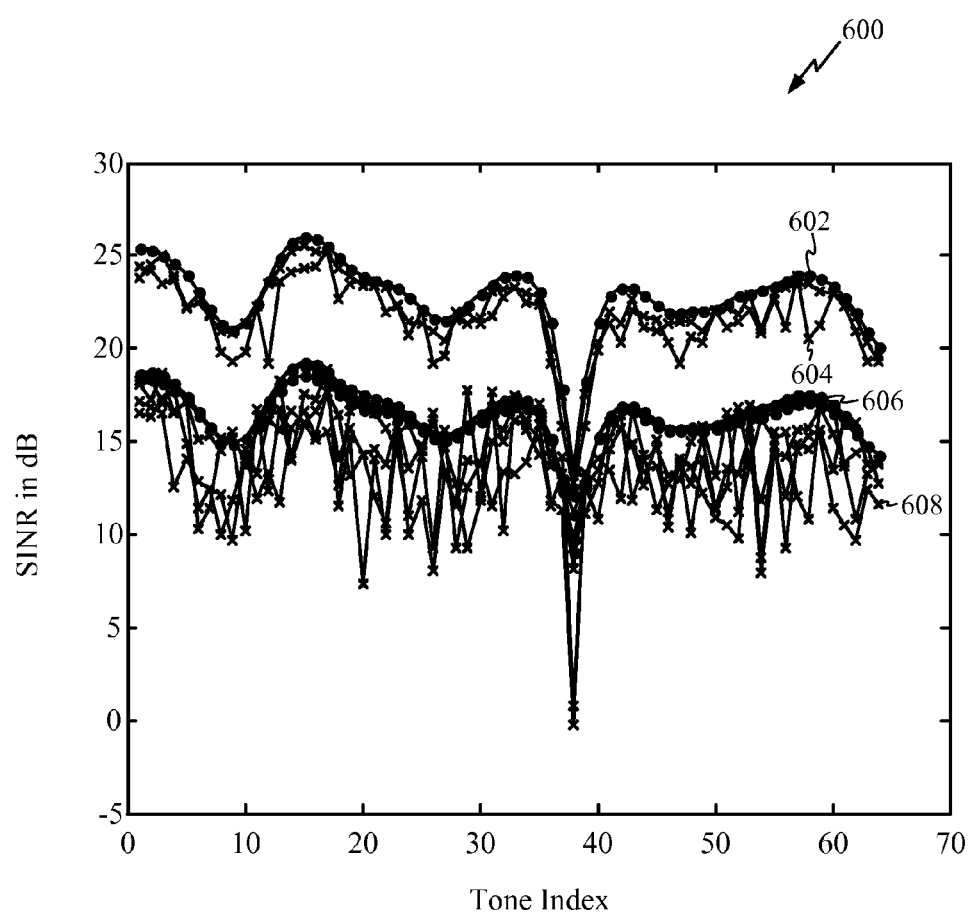
FIG. 6 illustrates signal to noise plus interference ratio (SINR) values vs. tone index for two users with unequal path-loss values and unequal rates utilizing the proposed scheduling algorithm, in accordance with certain aspects of the present disclosure.

FIG. 6 illustrates the simulation results for signal to noise plus interference ratio (SINR) values vs. tone index for two users with unequal path loss values and unequal rates utilizing the proposed heuristic algorithm, in accordance with certain aspects of the present disclosure. The figure illustrates the SINR values in dB for different users and different transmission tones. The curves 602 and 604 illustrate the SINR values for a user with a high rate and 90 dB path loss. The curves 602 and 604 show the SINR values for each tone without imperfections and with imperfections, respectively. The curves 606 and 608 illustrate the SINR values for a user with a low rate and 75 dB path loss. The curves 606 and 608 show the SINR values for each tone without imperfections and with imperfections, respectively.

Figure 7:
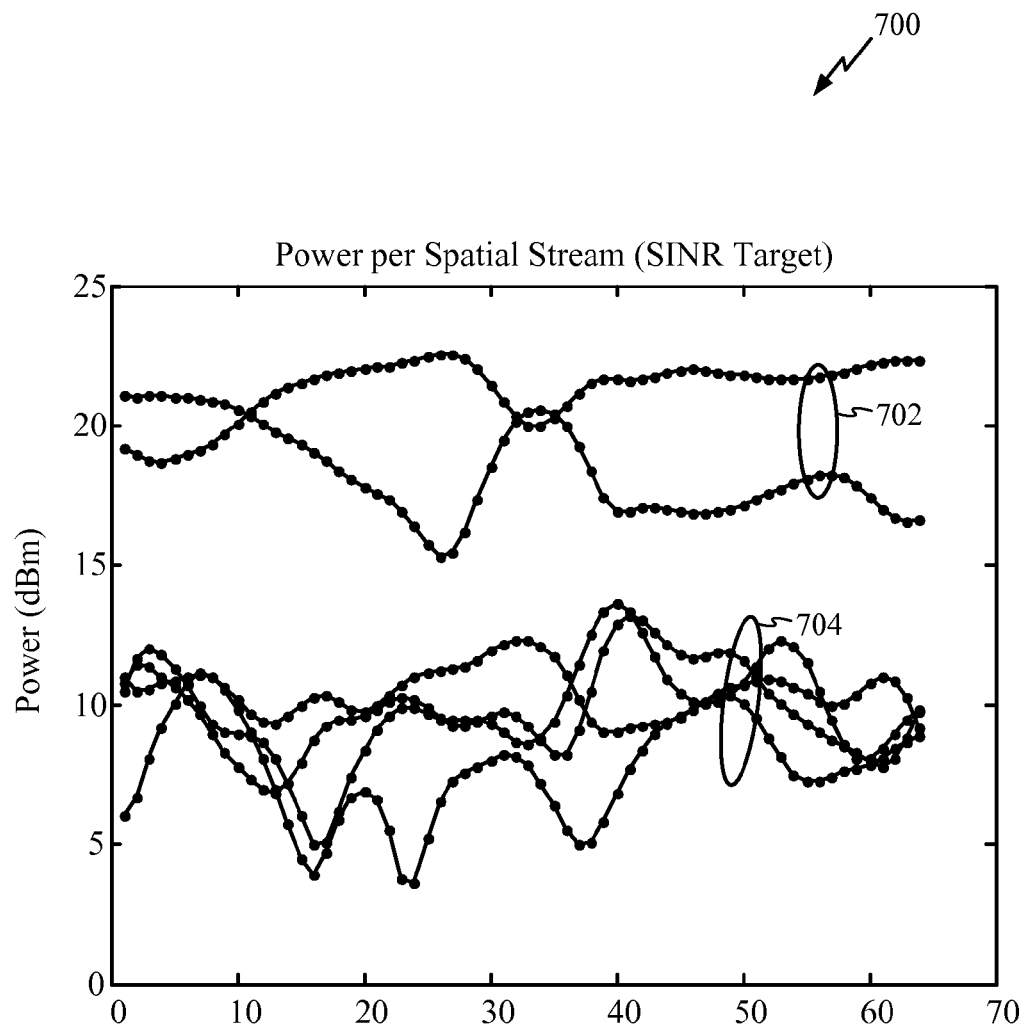
FIG. 7 illustrates power values per spatial stream vs. tone index for two users with unequal path loss values and unequal rates utilizing the proposed scheduling algorithm, in accordance with certain aspects of the present disclosure.

FIG. 7 illustrates power values per spatial stream vs. tone index for two users with unequal path loss values and unequal rates utilizing the proposed heuristic algorithm, in accordance with certain aspects of the present disclosure. The figure illustrates the power values in dBm for different users and different transmission tones. The upper set of curves 702 illustrates the power values for a user with a high rate and 90 dB path loss. The lower set of curves 704 shows the power values for a user with a low rate and 75 dB path loss.

The results show that a small reduction in the SINR of faraway users may result in a much bigger increase in SINR of the nearby users. Since the faraway users receive higher power, a small leakage from them may result in big performance degradation of nearby users.

In this disclosure, an MMSE based scheduler for frequency selective channels was proposed which takes into account packet sizes, path losses and power amplifier distortion. The MMSE method significantly outperforms ZF algorithm when all spatial streams are utilized since ZF is more sensitive to an ill-conditioned channel matrix. Channel estimation loss and interpolation loss may result because of selection of an improper MCS, in a case with unequal path loss, especially for nearby users.

The proposed method ensures that the calculated SINR targets are always over achieved. Therefore, by sacrificing a small portion of the SINR of the faraway users, the nearby users may perform much better.

Figure 4A:
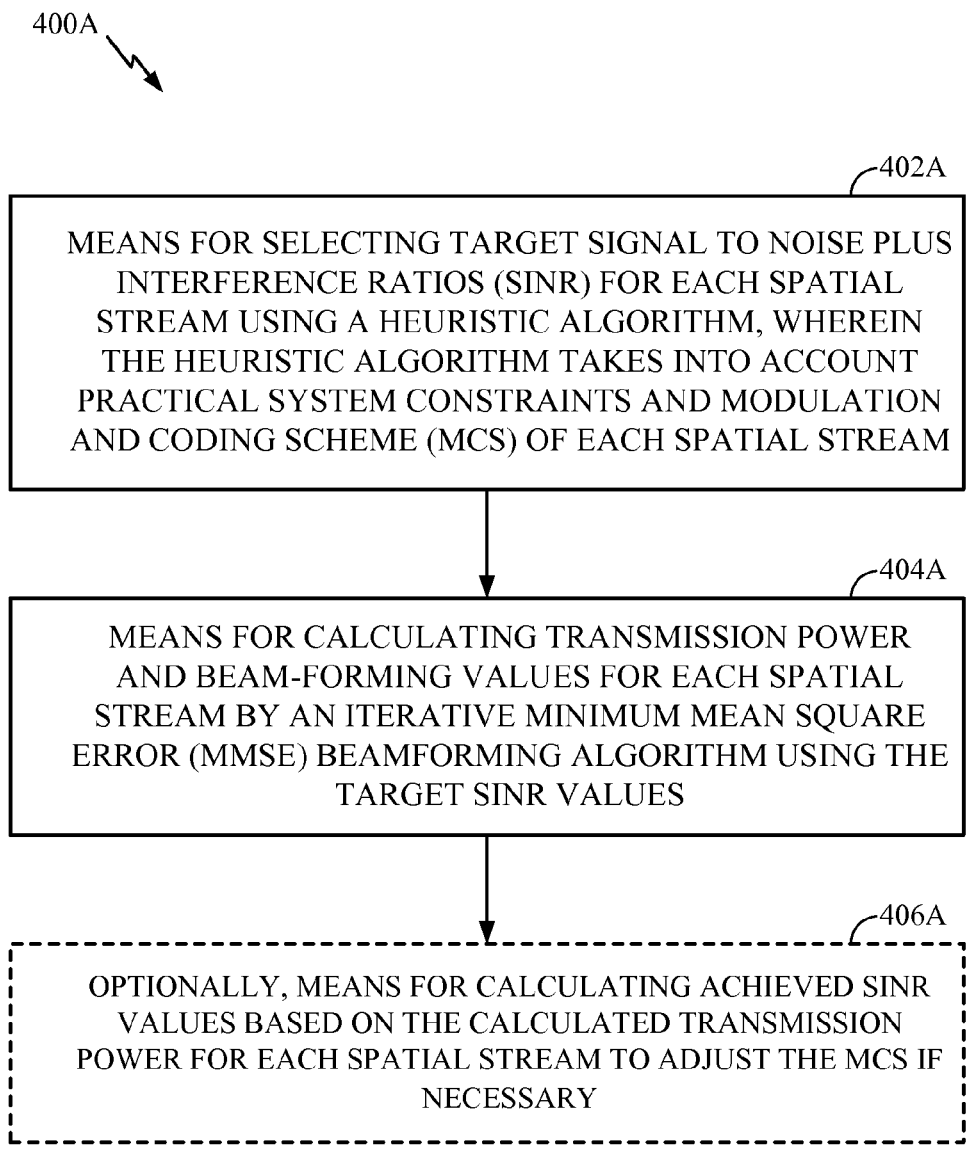
FIG. 4A illustrates example components capable of performing the operations shown in FIG. 4.
Figure 5A:
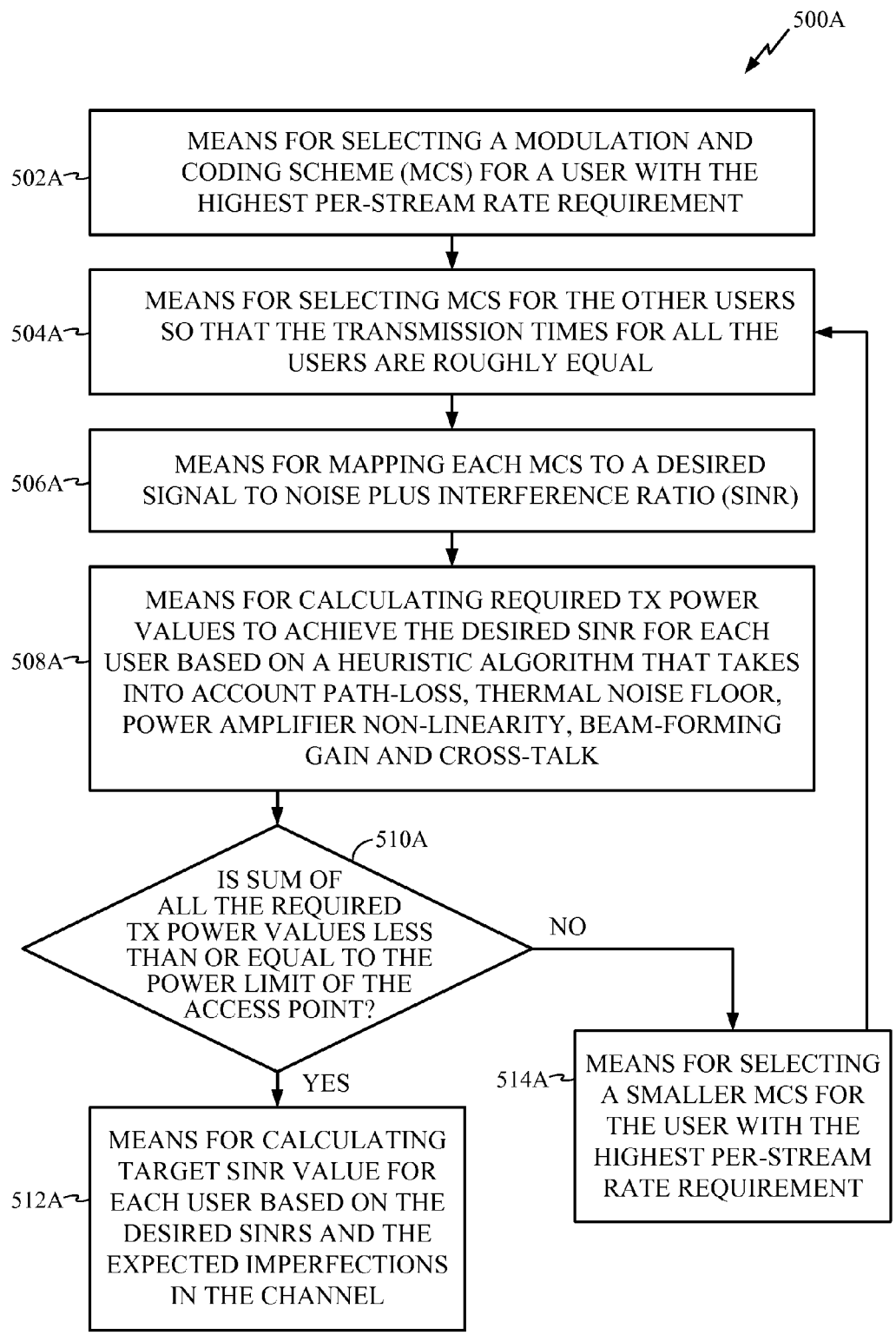
FIG. 5A illustrates example components capable of performing the operations shown in FIG. 5.

The various operations of methods described above may be performed by any suitable means capable of performing the corresponding functions. The means may include various hardware and/or software component(s) and/or module(s), including, but not limited to a circuit, an application specific integrate circuit (ASIC), or processor. Generally, where there are operations illustrated in Figures, those operations may have corresponding counterpart means-plus-function components with similar numbering. For example, blocks 402-406, illustrated in FIG. 4 correspond to circuit blocks 402A-406A, illustrated in FIG. 4A. In addition, blocks 502-514, illustrated in FIG. 5 correspond to circuit blocks 502A-514A, illustrated in FIG. 5A.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to embodiments of the present disclosure, other and further embodiments of the disclosure may be devised without departing from the basic scope thereof, and the scope thereof is determined by the claims that follow.

The invention claimed is:

1. A method for wireless communications by an access point, comprising:
   selecting one or more target signal to noise plus interference ratio (SINR) values for one or more spatial streams using a heuristic algorithm, wherein the heuristic algorithm takes into account practical system constraints and modulation and coding schemes (MCS) of the spatial streams, and wherein the heuristic algorithm does not include channel state information (CSI), wherein selecting the one or more target SINR values for the one or more spatial streams using the heuristic algorithm comprises:
   selecting an MCS for a user with a highest per-stream rate requirement;
   selecting MCSs for other users so that transmission time for all the users are approximately equal;
   mapping each of the MCSs to a desired SINR value;
   calculating a plurality of required transmit power values to achieve the desired SINR value for each of the users based on the heuristic algorithm that takes into account the practical system constraints; and
   calculating a target SINR value for each of the users based at least on the desired SINR values; and
   calculating one or more precoding matrices for the spatial streams for one or more frequency tones by an iterative minimum mean square error (MMSE) beamforming algorithm using the target SINR values.

2. The method of claim 1, wherein each of the one or more precoding matrices comprises a transmit power value and a beamforming vector for each of the spatial streams.

3. The method of claim 1, wherein the practical system constraints comprise path-loss value, thermal noise floor, power amplifier non-linearity, beamforming gain and cross-talk factor.

4. The method of claim 3, wherein the cross-talk factor depends on expected imperfections in a precoding matrix.

5. The method of claim 4, wherein the expected imperfections in the precoding matrix comprise an error in a channel state information at a transmitter, and degree of interpolation of the precoding matrix across the one or more frequency tones.

6. The method of claim 1, wherein calculating the target SINR value for each of the users based at least on the desired SINR values comprises:
   calculating the target SINR value for each of the users based on the desired SINR values and a cross-talk factor.

7. The method of claim 6, wherein the cross-talk factor comprises: loss due to interpolation of the one or more precoding matrices for a subset of the frequency tones and loss due to imperfect channel state information at a transmitter.

8. The method of claim 1, wherein calculating the plurality of required transmit power values to achieve the desired SINR value for each of the users based on the heuristic algorithm that takes into account the practical system constraints comprises:
calculating a required transmit power value for a stream i, $\hat{P}_{i,imperfect}$, based on an equation:

$$\hat{P}_{i,imperfect} = SINR_{i,Desired} - 10\log_{10}(\alpha_i) + 10\log_{10}(1+\beta \cdot 10^{SINR_{i,Desired}/10}) - G_{bf}(N_{Tx}, S) + 10\log_{10}(\alpha_i(\sigma_D^2 + \beta A) + \sigma_N^2)$$

wherein $SINR_{i,Desired}$ is the desired signal to noise plus interference ratio for the stream i, S is total number of downlink streams, $N_{Tx}$ is a number of transmit antennas at the access point, $G_{bf}(.)$ is a beamforming function, $\alpha_i$ is a path-loss value for the stream i, A represents a total power at a transmitter, $\beta$ represents a cross-talk factor, $\sigma_N^2$ is a thermal noise variance and $\sigma_D^2$ is a transmitter distortion noise.

9. The method of claim 1, wherein the target SINR value for a stream i is calculated based on an equation:

$$SINR_{target}^i = SINR_{desired}^i + \hat{P}_{i,imperfect} - \hat{P}_{i,perfect}$$

wherein $SINR_{i,Desired}$ is the desired signal to noise plus interference ratio for the stream i, $\hat{P}_{i,imperfect}$ is the required transmit power value for the stream i based on the heuristic algorithm, $\hat{P}_{i,perfect}$ is the required transmit power value for the stream i, without considering the practical system constraints.

10. The method of claim 1, further comprising:
selecting a smaller MCS for the user with the highest per-stream rate requirement if sum of all the required transmit power values is more than power limit of the access point.

11. The method of claim 1, further comprising:
calculating one or more achieved SINR values based on the one or more precoding matrices to adjust the MCSs.

12. A method for wireless communications by an access point, comprising:
   selecting one or more target signal to noise plus interference ratio (SINR) values for one or more spatial streams using a heuristic algorithm, wherein the heuristic algorithm takes into account practical system constraints and modulation and coding schemes (MCS) of the spatial streams, and wherein the heuristic algorithm does not include channel state information (SCI); and
   calculating one or more precoding matrices for the spatial streams for one or more frequency tones by an iterative minimum mean square error (MMSE) beamforming algorithm using the target SINR values, wherein calculating the one or more precoding matrices for the spatial streams for the one or more frequency tones by an iterative MMSE beamforming algorithm comprises:
   performing MMSE algorithm on the spatial streams to calculate the one or more precoding matrices for the spatial streams for a subset of the frequency tones; and
   interpolating the values of the one or more precoding matrices for the subset of the frequency tones to calculate the one or more precoding matrices for the rest of the frequency tones.

13. An apparatus for wireless communications by an access point, comprising:
   means for selecting one or more target signal to noise plus interference ratio (SINR) values for one or more spatial streams using a heuristic algorithm, wherein the heuristic algorithm takes into account practical system constraints and modulation and coding schemes (MCS) of the spatial streams, and wherein the heuristic algorithm does not include channel state information (CSI), wherein the means for selecting the one or more target SINR values for the one or more spatial streams using the heuristic algorithm comprises:
   means for selecting an MCS for a user with a highest per-stream rate requirement;
   means for selecting MCSs for other users so that transmission time for all the users are approximately equal;
   means for mapping each of the MCSs to a desired SINR value;
   means for calculating a plurality of required transmit power values to achieve the desired SINR value for each of the users based on the heuristic algorithm that takes into account the practical system constraints; and
means for calculating target SINR value for each of the users based at least on the desired SINR values; and
means for calculating one or more precoding matrices for the spatial streams for one or more frequency tones by an iterative minimum mean square error (MMSE) beamforming algorithm using the target SINR values.

14. The apparatus of claim 13, wherein each of the one or more precoding matrices comprises a transmit power value and a beamforming vector for each of the spatial streams.

15. The apparatus of claim 13, wherein the practical system constraints comprise path-loss value, thermal noise floor, power amplifier non-linearity, beamforming gain and cross-talk factor.

16. The apparatus of claim 15, wherein the cross-talk factor depends on expected imperfections in a precoding matrix.

17. The apparatus of claim 16, wherein the expected imperfections in the precoding matrix comprise an error in a channel state information at a transmitter, and degree of interpolation of the precoding matrix across the one or more frequency tones.

18. The apparatus of claim 13, wherein the means for calculating the target SINR value for each of the users based at least on the desired SINR values comprises:
means for calculating the target SINR value for each of the users based on the desired SINR values and a cross-talk factor.

19. The apparatus of claim 18, wherein the cross-talk factor comprises: loss due to interpolation of the one or more precoding matrices for a subset of the frequency tones and loss due to imperfect channel state information at a transmitter.

20. The apparatus of claim 13, wherein the means for calculating the plurality of required transmit power values to achieve the desired SINR value for each of the users based on the heuristic algorithm that takes into account the practical system constraints comprises:
means for calculating a required transmit power value for a stream i, $\hat{P}_{i,imperfect}$, based on an equation:

$$\hat{P}_{i,imperfect} = SINR_{i,Desired} - 10\log_{10}(\alpha_i) + 10\log_{10}(1 + \beta \cdot 10^{SINR_{i,Desired}/10}) - G_{bf}(N_{Tx}, S) + 10\log_{10}(\alpha_i(\sigma_D^2 + \beta A) + \sigma_N^2)$$

wherein $SINR_{i,Desired}$ is the desired signal to noise plus interference ratio for the stream i, S is total number of downlink streams, $N_{Tx}$ is a number of transmit antennas at the access point, $G_{bf}(.)$ is a beamforming function, $\alpha_i$ is a path-loss value for the stream i, A represents a total power at a transmitter, $\beta$ represents a cross-talk factor, $\sigma_N^2$ is a thermal noise variance and $\sigma_D^2$ is a transmitter distortion noise.

21. The apparatus of claim 13, wherein the target SINR value for a stream i is calculated based on an equation:

$$SINR_{target}^i = SINR_{desired}^i + \hat{P}_{i,imperfect} - \hat{P}_{i,perfect}$$

wherein $SINR_{i,Desired}$ is the desired signal to noise plus interference ratio for the stream i, $\hat{P}_{i,imperfect}$ is the required transmit power value for the stream i based on the heuristic algorithm, $\hat{P}_{i,perfect}$ is the required transmit power value for the stream i, without considering the practical system constraints.

22. The apparatus of claim 13, further comprising:
means for selecting a smaller MCS for the user with the highest per-stream rate requirement if sum of all the required transmit power values is more than power limit of the access point.

23. The apparatus of claim 13, further comprising:
means for calculating one or more achieved SINR values based on the one or more precoding matrices to adjust the MCSs.

24. An apparatus for wireless communications by an access point, comprising:
means for selecting one or more target signal to noise plus interference ratio (SINR) values for one or more spatial streams using a heuristic algorithm, wherein the heuristic algorithm takes into account practical system constraints and modulation and coding schemes (MCS) of the spatial streams, and wherein the heuristic algorithm does not include channel state information (CSI); and
means for calculating one or more precoding matrices for the spatial streams for one or more frequency tones by an iterative minimum mean square error (MMSE) beamforming algorithm using the target SINR values, wherein the means for calculating the one or more precoding matrices for the spatial streams for the one or more frequency tones by an iterative MMSE beamforming algorithm comprises:
means for performing MMSE algorithm on the spatial streams to calculate the one or more precoding matrices for the spatial streams for a subset of the frequency tones; and
means for interpolating the values of the one or more precoding matrices for the subset of the frequency tones to calculate the one or more precoding matrices for the rest of the frequency tones.

25. An apparatus for wireless communications by an access point, comprising:
logical circuit for selecting one or more target signal to noise plus interference ratio (SINR) values for one or more spatial streams using a heuristic algorithm, wherein the heuristic algorithm takes into account practical system constraints and modulation and coding schemes (MCS) of the spatial streams, and wherein the heuristic algorithm does not include channel state information (CSI), wherein the logical circuit for selecting the one or more target SINR values for the one or more spatial streams using the heuristic algorithm comprises:
logical circuit for selecting an MCS for a user with a highest per-stream rate requirement;
logical circuit for selecting MCSs for other users so that transmission time for all the users are approximately equal;
logical circuit for mapping each of the MCSs to a desired SINR value;
logical circuit for calculating a plurality of required transmit power values to achieve the desired SINR value for each of the users based on the heuristic algorithm that takes into account the practical system constraints; and
logical circuit for calculating target SINR value for each of the users based at least on the desired SINR values; and
logical circuit for calculating one or more precoding matrices for the spatial streams for one or more frequency tones by an iterative minimum mean square error (MMSE) beamforming algorithm using the target SINR values.

26. The apparatus of claim 25, wherein each of the one or more precoding matrices comprises a transmit power value and a beamforming vector for each of the spatial streams.

27. The apparatus of claim 25, wherein the practical system constraints comprise path-loss value, thermal noise floor, power amplifier non-linearity, beamforming gain and cross-talk factor.

28. The apparatus of claim 27, wherein the cross-talk factor depends on expected imperfections in a precoding matrix.

29. The apparatus of claim 28, wherein the expected imperfections in the precoding matrix comprise an error in a channel state information at a transmitter, and degree of interpolation of the precoding matrix across the one or more frequency tones.

30. The apparatus of claim 25, wherein the logical circuit for calculating the target SINR value for each of the users based at least on the desired SINR values comprises:
   logical circuit for calculating the target SINR value for each of the users based on the desired SINR values and a cross-talk factor.

31. The apparatus of claim 30, wherein the cross-talk factor comprises: loss due to interpolation of the one or more precoding matrices for a subset of the frequency tones and loss due to imperfect channel state information at a transmitter.

32. The apparatus of claim 25, wherein the logical circuit for calculating the plurality of required transmit power values to achieve the desired SINR value for each of the users based on the heuristic algorithm that takes into account the practical system constraints comprises:
   logical circuit for calculating a required transmit power value for a stream i, $\hat{P}_{i,imperfect}$, based on an equation:

$$\hat{P}_{i,imperfect} = SINR_{i,Desired} - 10\log_{10}(\alpha_i) + 10\log_{10}(1 + \beta \cdot 10^{SINR_{i,Desired}/10}) - G_{bf}(N_{Tx}, S) + 10\log_{10}(\alpha_i(\sigma_D^2 + \beta A) + \sigma_N^2)$$

wherein $SINR_{i,Desired}$ is the desired signal to noise plus interference ratio for the stream i, S is total number of downlink streams, $N_{Tx}$ is a number of transmit antennas at the access point, $G_{bf}(.)$ is a beamforming function, $\alpha_i$ is a path-loss value for the stream i, A represents a total power at a transmitter, $\beta$ represents a cross-talk factor, $\sigma_N^2$ is a thermal noise variance and $\sigma_D^2$ is a transmitter distortion noise.

33. The apparatus of claim 25, wherein the target SINR value for a stream i is calculated based on an equation:

$$SINR_{target}^i = SINR_{desired}^i + \hat{P}_{i,imperfect} - \hat{P}_{i,perfect}$$

wherein $SINR_{i,Desired}$ is the desired signal to noise plus interference ratio for the stream i, $\hat{P}_{i,imperfect}$ is the required transmit power value for the stream i based on the heuristic algorithm, $\hat{P}_{i,perfect}$ is the required transmit power value for the stream i, without considering the practical system constraints.

34. The apparatus of claim 25, further comprising:
   logical circuit for selecting a smaller MCS for the user with the highest per-stream rate requirement if sum of all the required transmit power values is more than power limit of the access point.

35. The apparatus of claim 25, further comprising:
   logical circuit for calculating one or more achieved SINR values based on the one or more precoding matrices to adjust the MCSs.

36. An apparatus for wireless communications by an access point, comprising:
   logical circuit for selecting one or more target signal to noise plus interference ratio (SINR) values for one or more spatial streams using a heuristic algorithm, wherein the heuristic algorithm takes into account practical system constraints and modulation and coding schemes (MCS) of the spatial streams, and wherein the heuristic algorithm does not include channel state information (CSI); and
   logical circuit for calculating one or more precoding matrices for the spatial streams for one or more frequency tones by an iterative minimum mean square error (MMSE) beamforming algorithm using the target SINR values, wherein the logical circuit for calculating the one or more precoding matrices for the spatial streams for the one or more frequency tones by an iterative MMSE beamforming algorithm comprises:
   logical circuit for performing MMSE algorithm on the spatial streams to calculate the one or more precoding matrices for the spatial streams for a subset of the frequency tones; and
   logical circuit for interpolating the values of the one or more precoding matrices for the subset of the frequency tones to calculate the one or more precoding matrices for the rest of the frequency tones.

37. A non-transitory computer readable medium having instructions stored thereon, the instructions being executable by one or more processors and the instructions comprising:
   instructions for selecting one or more target signal to noise plus interference ratio (SINR) values for one or more spatial streams using a heuristic algorithm, wherein the heuristic algorithm takes into account practical system constraints and modulation and coding schemes (MCS) of the spatial streams, and wherein the heuristic algorithm does not include channel state information (CSI), wherein the instructions for selecting the one or more target SINR values for the one or more spatial streams using the heuristic algorithm comprise:
   instructions for selecting an MCS for a user with a highest per-stream rate requirement;
   instructions for selecting MCSs for other users so that transmission time for all the users are approximately equal;
   instructions for mapping each of the MCSs to a desired SINR value;
   instructions for calculating a plurality of required transmit power values to achieve the desired SINR value for each of the users based on the heuristic algorithm that takes into account the practical system constraints; and
   instructions for calculating target SINR value for each of the users based at least on the desired SINR values; and
   instructions for calculating one or more precoding matrices for the spatial streams for one or more frequency tones by an iterative minimum mean square error (MMSE) beamforming algorithm using the target SINR values.

38. The non-transitory computer readable medium of claim 37, wherein each of the one or more precoding matrices comprises a transmit power value and a beamforming vector for each of the spatial streams.

39. The non-transitory computer readable medium of claim 37, wherein the practical system constraints comprise path-loss value, thermal noise floor, power amplifier non-linearity, beamforming gain and cross-talk factor.

40. The non-transitory computer readable medium of claim 39, wherein the cross-talk factor depends on expected imperfections in a precoding matrix.

41. The non-transitory computer readable medium of claim 40, wherein the expected imperfections in the precoding matrix comprise an error in a channel state information at a transmitter, and degree of interpolation of the precoding matrix across the one or more frequency tones.

42. The non-transitory computer readable medium of claim 37, wherein the instructions for calculating the target SINR value for each of the users based at least on the desired SINR values comprise:
   instructions for calculating the target SINR value for each of the users based on the desired SINR values and a cross-talk factor.

43. The non-transitory computer readable medium of claim 42, wherein the cross-talk factor comprises: loss due to interpolation of the one or more precoding matrices for a subset of the frequency tones and loss due to imperfect channel state information at a transmitter.

44. The non-transitory computer readable medium of claim 37, wherein the instructions for calculating the plurality of required transmit power values to achieve the desired SINR value for each of the users based on the heuristic algorithm that takes into account the practical system constraints comprise:

instructions for calculating a required transmit power value for a stream i, $\hat{P}_{i,imperfect}$, based on an equation:

$$\hat{P}_{i,imperfect} = SINR_{i,Desired} - 10 \log_{10}(\alpha_i) + 10 \log_{10}(1 + \beta \cdot 10^{SINR_{i,Desired}/10}) - G_{bf}(N_{Tx}, S) + 10 \log_{10}(\alpha_i(\sigma_D^2 + \beta A) + \sigma_N^2)$$

wherein $SINR_{i,Desired}$ is the desired signal to noise plus interference ratio for the stream i, S is total number of downlink streams, $N_{Tx}$ is a number of transmit antennas at the access point, $G_{bf}(.)$ is a beamforming function, $\alpha_i$ is a path-loss value for the stream i, A represents a total power at a transmitter, $\beta$ represents a cross-talk factor, $\sigma_N^2$ is a thermal noise variance and $\sigma_D^2$ is a transmitter distortion noise.

45. The non-transitory computer readable medium of claim 37, wherein the target SINR value for a stream i is calculated based on an equation:

$$SINR_{target}^i = SINR_{desired}^i + \hat{P}_{i,imperfect} - \hat{P}_{i,perfect}$$

wherein $SINR_{i,Desired}$ is the desired signal to noise plus interference ratio for the stream i, $\hat{P}_{i,imperfect}$ is the required transmit power value for the stream i based on the heuristic algorithm, $\hat{P}_{i,perfect}$ is the required transmit power value for the stream i, without considering the practical system constraints.

46. The non-transitory computer readable medium of claim 37, further comprising:

instructions for selecting a smaller MCS for the user with the highest per-stream rate requirement if sum of all the required transmit power values is more than power limit of the access point.

47. The non-transitory computer readable medium of claim 37, further comprising:

instructions for calculating one or more achieved SINR values based on the one or more precoding matrices to adjust the MCSs.

48. A non-transitory computer readable medium having instructions stored thereon, the instructions being executable by one or more processors and the instructions comprising:

instructions for selecting one or more target signal to noise plus interference ratio (SINR) values for one or more spatial streams using a heuristic algorithm, wherein the heuristic algorithm takes into account practical system constraints and modulation and coding schemes (MCS) of the spatial streams, and wherein the heuristic algorithm does not include channel state information (CSI); and instructions for calculating one or more precoding matrices for the spatial streams for one or more frequency tones by an iterative minimum mean square error (MMSE) beamforming algorithm using the target SINR values, wherein the instructions for calculating the one or more precoding matrices for the spatial streams for the one or more frequency tones by an iterative MMSE beamforming algorithm comprise:

instructions for performing MMSE algorithm on the spatial streams to calculate the one or more precoding matrices for the spatial streams for a subset of the frequency tones; and instructions for interpolating the values of the one or more precoding matrices for the subset of the frequency tones to calculate the one or more precoding matrices for the rest of the frequency tones.

\* \* \* \* \*